United States Patent [19]

Born et al.

[11] Patent Number: 4,802,571
[45] Date of Patent: Feb. 7, 1989

[54] APPARATUS FOR CONVEYING SUSPENDED BOTTLES

[75] Inventors: Gerhard Born, Bingen; Paul Elsner, Bad Kreuznach; Heinz-Jürgen Scherer, Windesheim, all of Fed. Rep. of Germany

[73] Assignee: Seitz Enzinger Noll Maschinenbau Aktiengesellschaft, Mannheim, Fed. Rep. of Germany

[21] Appl. No.: 856,695

[22] Filed: Apr. 25, 1986

[30] Foreign Application Priority Data

Apr. 27, 1985 [DE] Fed. Rep. of Germany ....... 3515353

[51] Int. Cl.⁴ ............................................. B65G 15/14
[52] U.S. Cl. ..................................... 198/627; 198/817
[58] Field of Search ........................ 198/626, 817, 627

[56] References Cited

U.S. PATENT DOCUMENTS

| | | | |
|---|---|---|---|
| 1,535,785 | 4/1925 | Luce | 198/817 |
| 2,862,606 | 12/1958 | Schlichting | 198/626 |
| 3,124,231 | 3/1964 | Ott, Jr. | 198/817 X |
| 3,289,867 | 12/1966 | Burke | 198/626 X |
| 3,706,369 | 12/1972 | Ishida et al. | 198/626 X |
| 3,840,111 | 10/1974 | Randrup | 198/817 |
| 3,850,284 | 11/1974 | Roberts | 198/626 X |
| 3,978,971 | 9/1976 | Conrow et al. | 198/626 X |
| 3,978,979 | 9/1976 | Mezey | 198/817 X |
| 4,114,347 | 9/1978 | Morris et al. | 198/803.14 X |
| 4,230,223 | 10/1980 | Flajnik | 198/817 |
| 4,422,541 | 12/1983 | Lisec | 198/817 X |

Primary Examiner—Robert J. Spar
Assistant Examiner—D. Glenn Dayoan
Attorney, Agent, or Firm—Becker & Becker, Inc.

[57] ABSTRACT

An apparatus for conveying bottles that each have an annular bead on the neck of the bottle. A conveyor line, which extends over the respectively desired conveying path, is provided with a bottle carrier that extends along the conveying path, extends below the bead on the neck of the bottle, and guides the bottles in a suspended state, via the beads, with play, through a guide slot that extends along the conveying path. The conveyer line is also provided with mechanisms for providing the bottles with a feed movement for conveying the latter. To provide a considerably more uniform conveying speed, avoid bottles striking one another, reduce the consumption of energy, and reduce manufacturing expenses, the mechanisms provide the feed movement parallel to the guide slot for the bottle necks, with the guide slot being formed on the bottle carrier. The mechanisms are provided with at least one mechanically movable driving element that mechanically engages the bottles that are to be conveyed. The mechanisms are also provided with mechanical drives and guides for the driving element. Particularly advantageous is the combination of the bottle carrier and the feed mechanism via two conveyers that are guided parallel to one another and at a lateral distance from the guide slot. The beads of the bottle necks rest directly on the side edge regions of these conveyers, which side edge regions are disposed on both sides of the guide slot.

12 Claims, 9 Drawing Sheets

APPARATUS FOR CONVEYING SUSPENDED BOTTLES

BACKGROUND OF THE INVENTION

1. Field of the Invention

The present invention relates to an apparatus for conveying bottles, especially plastic bottles, between and/or within treatment or other stations, with the bottles each having an annular bead on the neck of the bottle. A conveyer line, which extends over the respectively desired conveying path, is provided with a bottle carrier that extends along the conveying path, extends below the bead on the neck of the bottle, and conveys the bottles in a suspended state, via the bead, with play, through a guide slot that extends along the conveying path. The conveyer line is also provided with mechanisms for providing the bottles with a feed movement for conveying them.

2. Description of the Prior Art

With conveying apparatus of this type, such as disclosed, for example, in the company publication "NEU VOUS INFORME SUR LE JETSTREAM" of ETABLISSEMENTS NEU, F-59700 MARCQ-EN-BAROEUL, pneumatic conveying mechanisms are provided for the bottles. For this purpose, these heretofore known conveying apparatus are provided on the underside of the conveyer line with two plastic guide strips that, as bottle carriers, extend parallel to one another and extend below the bead on the neck of the bottle. A channel-like hollow space, which is supplied with conveying air, is formed above the plastic strip in the housing of the conveyer line. That portion of the bottle neck that extends above the bead projects into this hollow space. The conveying air is supplied to this channel via nozzles that are mounted in the side walls of the channel. However, these known apparatus for pneumatically conveying plastic bottles are deficient in that the feed speed of the bottles over the length of the conveying path is subjected to unavoidable fluctuations. As a result, successive bottles can strike against one another, for example in the exit region.

Even though with plastic bottles this striking against one another does not cause any great danger of breakage, nevertheless considerable noise results and the surfaces of the bottles become scratched. Furthermore, with these known pneumatic conveying apparatus, air noise and loss of conveying air cannot be avoided, because conveying air constantly escapes through the guide slot formed between the guide strips. For many applications, pneumatic conveying is also unsuitable because dust and bacteria are carried into the respective spaces along with the conveying air. To avoid these last-mentioned drawbacks, air filters that are used often tend to become clogged, making them ineffective. In addition, such air filters represent additional consumption of energy.

In contrast, it is an object of the present invention to considerably improve a bottle-conveying apparatus of the aforementioned general type in such a way that a uniform feed speed and sensitive control or regulation of the conveying speed is assured, a striking of the bottles against one another and generation of noise is avoided, and the short comings caused by pneumatic conveying means are eliminated.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The apparatus of the present invention is characterized primarily in that the feed movement mechanisms provide feed movement parallel to the guide slot for the neck of the bottles, which guide slot is formed on the bottle carrier, with these mechanisms being provided with at least one mechanically movable driving element means (side edge regions/driving fingers) that mechanically engages the bottles that are to be conveyed; the mechanisms are also provided with drive means and guide means for the driving element means.

Beyond realization of the aforementioned object, the present invention, in contrast to the situation encountered with the use of pneumatic conveying means, offers a considerable reduction in the energy that is required, a lower space requirement, a more careful conveyance, and better possibilities for the three-dimensional course guidance of the conveyer line, with rises and curves being able to be incorporated into the conveying line in a considerably more favorable manner than was possible with the heretofore known bottle-conveying apparatus. In so doing, the conveying apparatus of the present invention can be produced much more economically than can heretofore known apparatus of this general type.

It is particularly expedient, within the scope of the present invention, if the driving element means, in the form of a side edge region that delimits one side of the guide slot for the bottle necks, is formed on at least one endless conveyer that is movable along the conveyer line, i.e. along the guide slot, at a feed speed that corresponds to the desired conveying speed; at the same time, this side edge region forms a portion of the bottle carrier that extends below the bead on the neck of the bottles, with further bottle carrier parts being provided that keep the beads on the side edge region of the conveyer. Transfer of the feed movement to the bottles is then effected directly from the conveyer to the bottle neck bead that is disposed on the conveyer. As a result, there exists a direct and constant frictional connection between the conveyer and the bottle neck bead. Pursuant to a particularly advantageous embodiment of the present invention, the further bottle carrier parts, which cooperate with the conveyer, are formed by a second conveyer, with the two conveyers being guided parallel to, and at such a distance from, one another that the guide slot for the bottle necks is formed between the opposed side edge regions of these conveyers, with a secure seating for the bottle neck beads being formed on each of these two side edge regions. Such a pair of conveyers that defines the guide slot between them provides a particularly secure seating for the bottle neck beads, and hence a particularly reliable guidance for the bottles that are to be conveyed. The desired conveying speed for the bottles can be set by appropriately adjusting the feed speed of the two conveyers. The two conveyers are preferably operated at the same feed speed, namely the desired conveying speed for the bottles. However, in this embodiment of the present invention, the bottles can be rotated during the conveyance by imparting different feed speeds to the two conveyers. This can be of importance, for example, within treatment stations, inspection stations, etc.

In another embodiment of the present invention, again a conveyer is provided that forms a part of the bottle carrier and extends along the guide slot. However, in this embodiment the further parts of the bottle carrier include a cooperating guide strip that is fixed to the conveyer line, extends parallel to the conveyer, and is disposed at such a distance from the side edge region of the latter that a guide slot for the bottle necks is provided, with play, and a secure seating for the bottle neck beads is formed on the side edge region of the conveyer. In this embodiment of the invention, the conveying speed can be adjusted in a particularly economical manner, because a single conveyer only, and consequently also a single drive mechanism only for the conveyer, are required. In addition, in this embodiment the apparatus can be operated at a particularly low consumption of energy. It is of particular advantage to dispose the upper surface of the cooperating guide strip lower than the supporting surface of the side edge region of the conveyer, and to provide a stationary guide rail, as a further part of the bottle carrier, that engages the bulged body of the bottle below the conveyer. In this way, the friction of the bottle parts at the conveyer and at the cooperating guide strip is considerably reduced, and rotation of the bottles due to contact of the bottle neck bead with the cooperating guide strip is avoided. In this embodiment, the conveying apparatus can be adjusted in a particularly advantageous manner to different bottle sizes. For this purpose, the lateral distance between the cooperating guide strip and the side edge region of the conveyer can be adjusted; in addition, the guide rail can also be adjusted relative to the bottles that are to be conveyed.

In all embodiments of the present invention where a conveyer is provided upon the side edge region of which the bottle neck bead is placed, this conveyer can be embodied in various forms. For example, the conveyer can be a hinged chain that is able to follow a curved path, with said chain having at least one side edge region, in adjacent thereto a guide region that is raised relative to the side edge region. Such hinged chains are efficient and durable conveying elements, especially in chain conveyers. Each conveyer can also be in the form of an endless, flexible belt that has at least one side edge region, which forms the support part for the bottle neck beads, and a strip-like guide region that is thicker than the side edge region.

Such conveyers that are provided with a guide region are preferably embodied and arranged in such a way that the guide region is offset relative to the side edge region as a thickened portion on only one side of the hinged chain or belt. The continuously smooth side of the hinged chain or belt is guided on the surface of a bottom wall portion of the conveyer line housing. That edge surface of the side edge region on the side opposite the smooth or planar guide side forms a support surface strip for the bottle neck beads.

Another possibility for the embodiment and arrangement of conveyers that engage the bottle neck beads from below and directly support the bottles is to embody each conveyer as a flexible endless belt, with guide elements directing a side edge of the conveying run of such a belt upwardly at an angle to below the bottle neck beads. Each of the conveyers can also be embodied as an endless, flexible profiled cord, especially a round cord, with cord-guiding elements guiding at least a portion of such a cord below the bottle neck beads to support the latter and form the guide slot for the bottle necks.

Also within the scope of the present invention are embodiments of the conveying apparatus that provide complete separation between the bottle carrier and the mechanisms for providing the feed movement. In one such embodiment, for example where the bottle carrier is formed by two parallel sliding glide elements that define between them the guide slot for the bottle necks, there is provided a flexible, endless conveyer that is spaced from the guide elements and is provided with mechanical driving elements that extend into the conveying path for the bottles or the bottle necks, and in particular extend into that space of the conveying path that is provided above the guide elements.

With all embodiments of the present invention, and especially with such embodiments where a rotating endless conveyer is provided that directly engages the beads of the bottle necks, the guide slot for these bottle necks should be widened in an inlet region of the conveyer line, and should preferably be wider than the diameter of the bottle neck beads. Along the transition guide section, the guide slot should narrow continuously until the preset slot width is achieved. A similar configuration can also be provided at the exit of a conveyer line in order to reliably bring the bottle neck bead out of the region of a conveyer.

Naturally, since a drive mechanism is provided for the mechanical mechanisms that provide the feed movement for the bottles that are to be conveyed, the length of such a feed mechanism should not be greater than an optimum value in order to reduce friction losses to the greatest extent possible. Thus, with longer conveyer lines, transition stations can be provided that contain mechanisms for guiding two or more independently driven endless conveyer belts or conveyer elements, and also contain mechanisms for transferring the bottles from one endless conveyer belt to the next endless conveyer belt disposed downstream when viewed in the conveying direction, or mechanisms for transferring the bottles from the driving elements of one endless conveyer element to the driving elements of the next endless conveyer element disposed downstream when viewed in the conveying direction.

In order to provide protection against dirt and external influences, it is advisable to provide the conveyer line, above the guide slot, with an elongated housing that covers associated parts of the bottle carrier and mechanisms for providing the bottles with a feed movement. This housing can be provided with a guide space for the necks of the bottles, and can be opened downwardly via the guide slot.

DESCRIPTION OF PREFERRED EMBODIMENTS

Referring now to the drawings in detail, the illustrated embodiments relate to a conveying apparatus for bottles 21 that are made of plastic, for example by being blown. The neck 22 of the bottle 21 is provided with a radially projecting collar or bead 23 that extends all the way around. The bottles 21 are conveyed in a suspended state in a conveyer line 24 that extends between treatment stations or between other stations, or even within treatment stations. The conveyer line 24 is provided with a housing 25 that accommodates the components of the conveying apparatus. The interior of the housing 25 is provided with a chamber or hollow space 26 that can be closed off toward the top The underside of the hollow space 26 can be open via a guide slot 27, the width of which conforms with play to the diameter of the bottle neck 22, yet is less than the diameter of the bead 23, so that in every position of the bottle 21, the bead 23 is prevented from passing through the slot 27. In principle, in all of the illustrated embodiments the bottle-conveying apparatus is provided with a bottle-support mechanism that engages the bead 23, and with means for providing the feed movement parallel to the guide slot 27, which is formed on the bottle-support mechanism.

Figure 1:
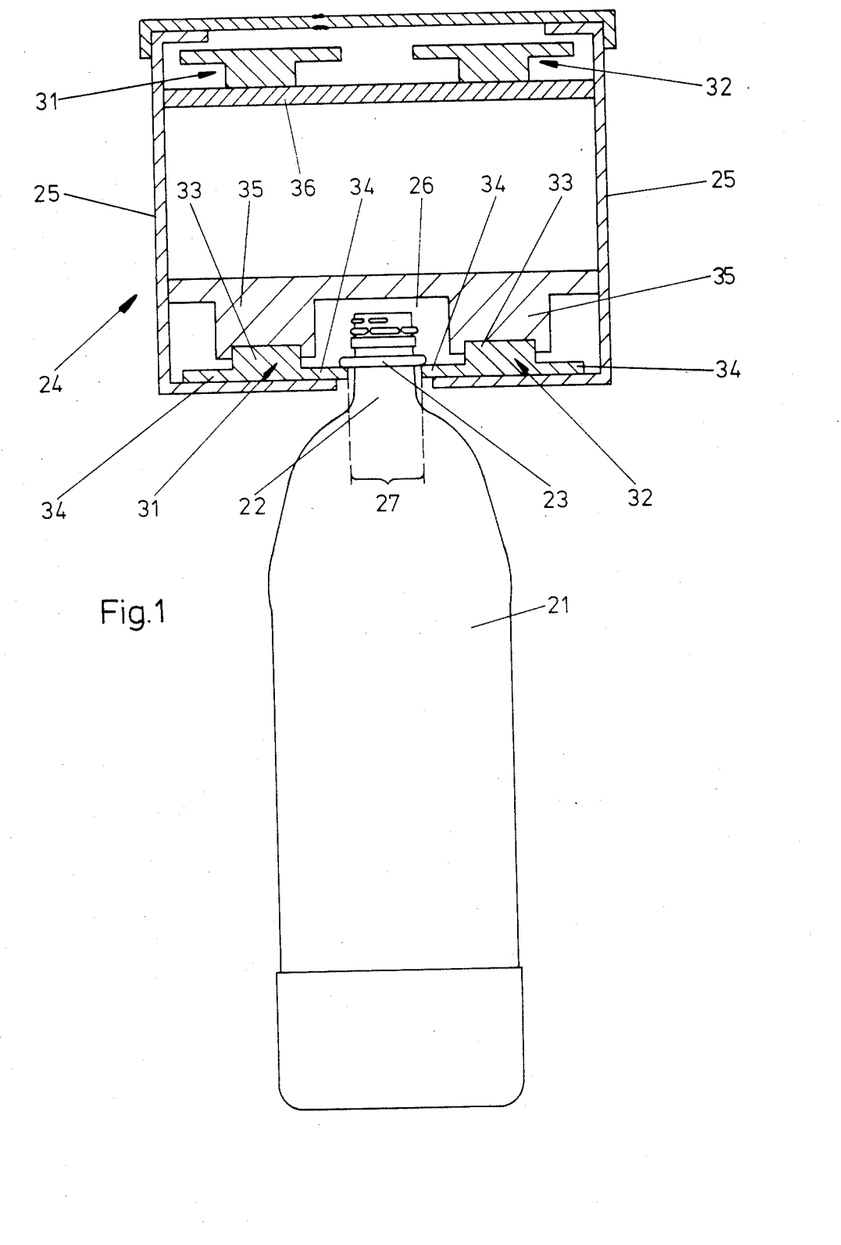
FIG. 1 illustrates in a vertical cross-sectional view one exemplary embodiment of the inventive bottle-conveying apparatus, and shows two conveyers in the form of hinged chains.
Figure 2:
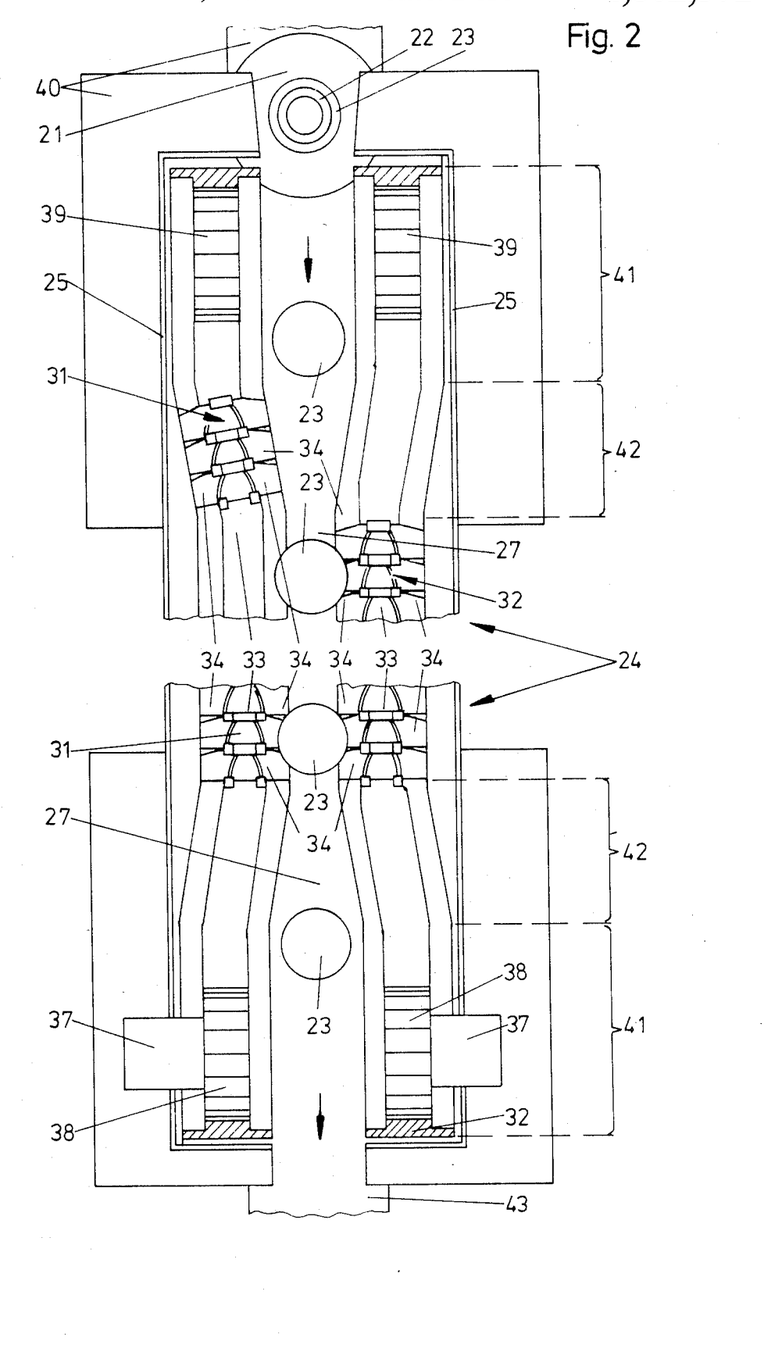
FIG. 2 is a horizontal section through the inlet region and the exit region of the bottle-conveying apparatus of FIG. 1.

In the embodiment illustrated in FIGS. 1 and 2, two hinged chains 31 and 32 are provided, each of which has a central guide region 33 formed by the hinge joints of its chain links; each chain 31 and 32 also has two thin side edge regions 34 that are formed by the plates of the chain links. The hinged chains 31 and 32 are endless and are able to follow a curved path. The lower runs of the belts are used for conveying the bottles 21, and form the guide slot 27 between the opposite side edge regions 34 of the two chains 31 and 32. For this purpose, the lower runs of the hinged chains 31 and 32 can be guided via guide elements 35 that engage the guide regions 33 and are distributed either over the entire length of the conveyer line 24 or at greater or lesser intervals The upper runs of the two hinged chains 31 and 32 move over plate-like or rod-like supports 36 that are distributed over the entire length of the conveyer line 24 or at intervals.

As can be seen in FIG. 2, drive units 37 are provided at one end of a conveyer line section, preferably at the exit end. Via drive gears 38, these drive units 37 continuously rotate the hinged chains 31 and 32. Mounted at the other end of a conveyer line section, preferably the inlet end, are guide wheels 39 for the plastic hinged chains 31 and 32. As can be seen in FIG. 2, the guide slot 27 is widened in the inlet region of the conveyer line 24 to such an extent that the beads 23 on the necks 22 of the bottles 21 that are to be conveyed can pass between the opposite side edge regions 34 of the hinged chains 31 and 32. In this way, it is possible to introduce the bottles 21 into the conveyer line 24, for example by lifting the bottles from below by means of a loading device 40 that lifts the bottles 21, via their beads 23, past the side edge regions 34 of the hinged chains 31 and 32. The bottles are introduced into the conveyer line 24, preferably in the conveying direction of the hinged chains 31 and 32, by means of a conventional conveyer belt In so doing, the beads 23 of the bottles are moved through the lateral deflection of the hinged chains 31 and 32 in the widened section 41 of the guide slot 27 between the upwardly diverted side edge regions 34 of the hinged chains 31 and 32. After this widened section 41, the conveyer line 24 has a transition section 42 in which the hinged chains 31 and 32, via the guide elements 35, laterally approach one another until the established normal width of the guide slot 27 is achieved. At the exit region of the conveyer line 24, there is again provided a transition section 42 and a widened section 41 of the guide slot 27 in order to permit the bottle bead 23 to exit between the side edge regions 34 of the hinged chains 31 and 32. Also disposed in the exit region is a receiving and conveying unit 43, for example in the manner of a processing machine, for example a conveyer belt that feeds a filling machine, with the unit 43 supporting the bottoms of the released bottles 21 and conveying them further.

As can be seen in FIG. 1, the bottle 21 is carried through the conveyer line 24 by the two hinged chains 31 and 32 via the adjacent opposed side edge regions 34, which engage underneath the bead 23. Thus, the two hinged chains 31 and 32 in cooperation form not only the bottle carrier, but also the mechanisms for providing the feed movement to the bottles. The two hinged chains 31 and 32 are operated at the same speed, namely the desired feed speed for the bottles However, the two chains 31 and 32 can also be driven at different feed speeds, as a result of which a conveying speed would be obtained for the bottles 21 in conformity with the average between the two feed speeds of the hinged chains 31 and 32; a rotational movement of the bottles about their axes would also be obtained.

As shown in FIG. 1, the hinged chains 31 and 32 of this embodiment are arranged in such a way that the flat, downwardly directed side of the bottom runs of the chains run on the base of the conveyer line housing 25, whereas the guide region 33 of the hinged chains 31 and 32, where the hinged joints are contained, is guided in the guide elements 35.

Figure 3:
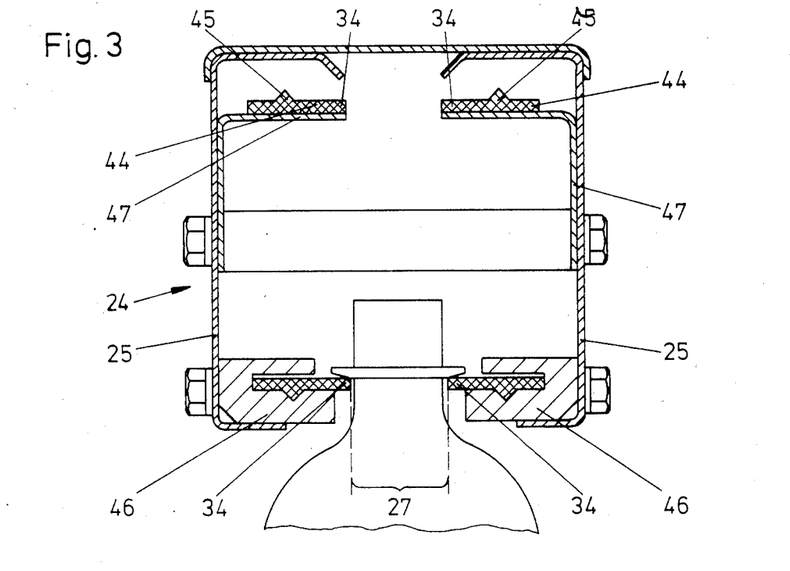
FIG. 3 is a vertical cross-sectional view through an exemplary embodiment of the inventive bottle-conveying apparatus having two conveyers in the form of flexible, profiled belts.

In the embodiment of FIG. 3, in place of the hinged chains, flexible, profiled, and endless flat belts 44 are provided, which in their central portion have a guide bead 45. In the lower run, these profiled flat belts 44 travel in conveying guide elements 46, whereas in the upper run these belts travel over return elements 47. In this embodiment also, the bottles 21 that are to be conveyed are carried through the conveyer line 24 by the adjacent opposed side edge regions 34 of the profiled flat belts 44. The side edge regions of the two profiled flat belts 44, which travel in the conveying guide elements 46, form not only the bottle carrier but also the mechanisms for providing the feed movement to the bottles that are to be conveyed.

Figure 4:
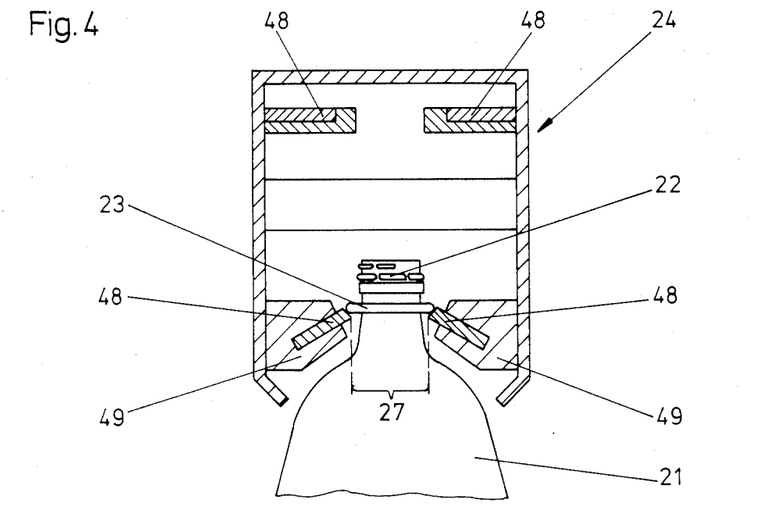
FIG. 4 is a vertical cross-sectional view through a further embodiment of the inventive bottle-conveying apparatus having two conveyers in the form of flat belts.

In the embodiment of FIG. 4, as a modification of the embodiment of FIG. 3, endless flat belts 48 having a simple rectangular profile are provided as feed or conveying members (conveyers). The lower runs of these flat belts 48 are used for conveying the bottles 21, and are placed at an angle relative to one another, in a roof-shaped manner, via sliding guide elements 49, so that both flat belts 48 support the bead 23 on the bottle neck 22 at an angle from below. In this embodiment also, the opposite side edges or side edge regions of the two flat belts 48 delimit the guide slot 27, so that also in this embodiment the flat belts 48, in conjunction with the sliding guide elements 49, form not only the bottle carrier but also the mechanisms for providing the feed movement to the bottles.

Figure 5:
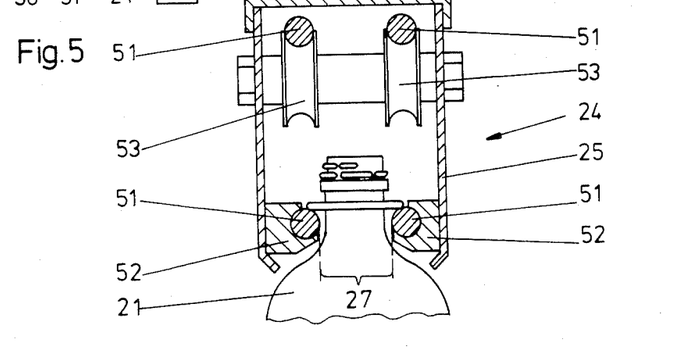
FIG. 5 shows an embodiment of the inventive bottle-conveying apparatus having two conveyers in the form of round cords.
Figure 6:
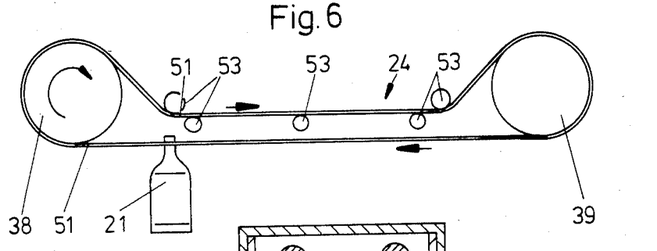
FIG. 6 is a diagrammatic view showing the guidance of the two round cords of the apparatus of FIG. 5.

In the embodiment of FIGS. 5 and 6, the conveying means are formed by two profiled cords, namely endless round cords 51, that are guided parallel to one another at a lateral distance that corresponds to the width of the guide slot 27. In the lower runs that are used for conveying the bottles 21, these round cords 51 travel through sliding guide elements 52 which, to achieve the required guidance reliability, are embodied as continuous strips or blocks that are spaced slightly from one another.

As shown in FIG. 6, at one end of the conveyer line 24 each of the round cords 51 is guided over a drive gear 38, while at the other end of the conveyer line 24 the round cords 51 are guided over guide wheels 39. On the upper return runs, the two round cords 51 travel between guide pulleys 53.

Figure 7:
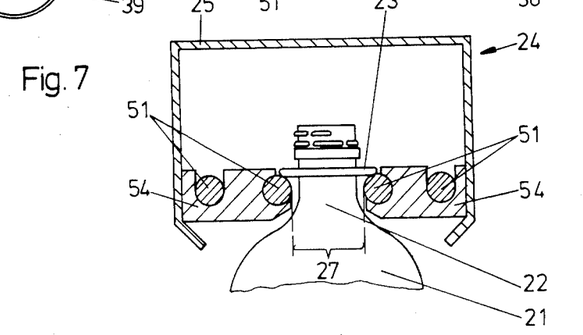
FIG. 7 is a vertical cross-sectional view of an embodiment of the inventive bottle-conveying apparatus having two conveyers in the form of round cords.
Figure 8:
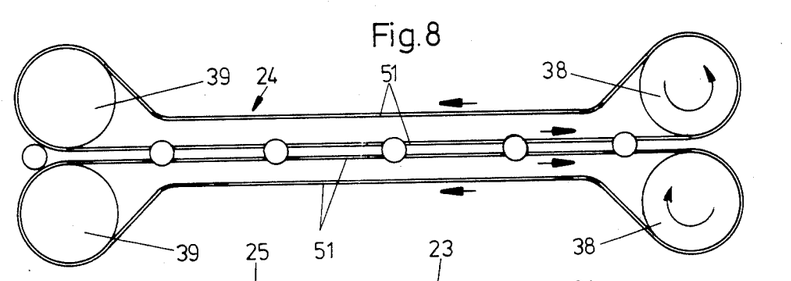
FIG. 8 is a diagrammatic view showing the guidance of the round cords of the apparatus of FIG. 7.

In the modified embodiment of FIGS. 7 and 8, endless round cords 51 are again provided for forming the bottle carrier and the feed mechanism for the bottles. At one end of the conveyer line 24 each of these round cords 51 is guided over a drive gear 38, while at the other end of the conveyer line 24, and in particular at the inlet end, the cords 51 are guided over respective guide wheels 39. However, in this embodiment, the two runs of the round cords 51 formed within the conveyer line 24, i.e. within the conveyer line housing 25, are disposed horizontally next to one another and travel in double sliding guide elements 54. In so doing, the inner runs are used for carrying and conveying bottles 21, with the mutual lateral spacing between these runs forming the guide slot 27. This means that the mutual lateral spacing of the two inner runs of the round cords 51 is greater than the diameter of the bottle neck 22 by the desired play, but is sufficiently less than the diameter of the bottle neck bead 23, so that the bottle is reliably held in a suspended state on the two round cords 51 in every position. This is assured by guiding the inner runs of the two round cords 51 in the sliding guide elements 54. In both the embodiments of FIGS. 5 and 6 as well as in FIGS. 7 and 8, the two round cords 51, in conjunction with the sliding guide elements 52 or 54 and their drive units, form not only the bottle carrier but also the mechanisms for providing the bottle feed.

Figure 9:
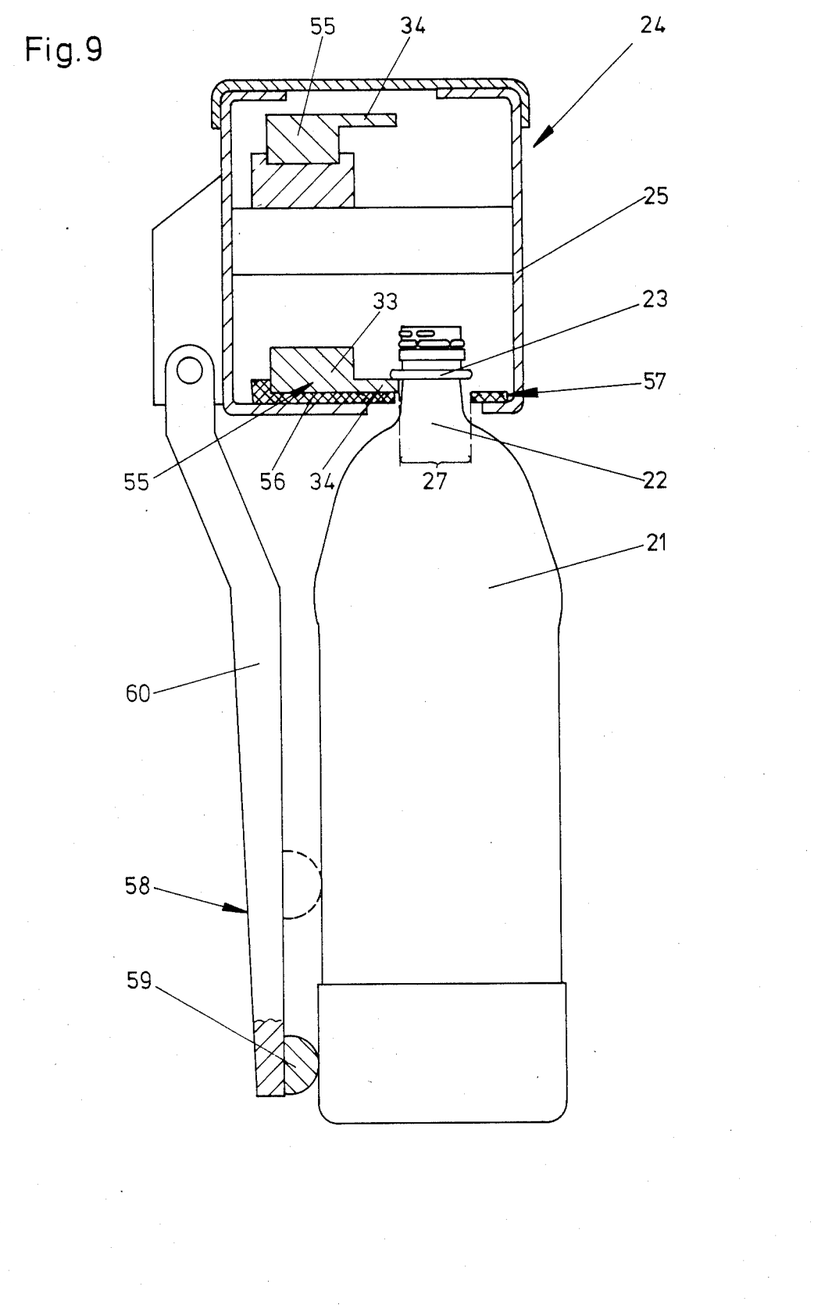
FIG. 9 is a vertical cross-sectional view through another embodiment of the inventive bottle conveying apparatus having a conveyer and a counter guide that cooperates with the conveyer as part of the bottle carrier.
Figure 10:
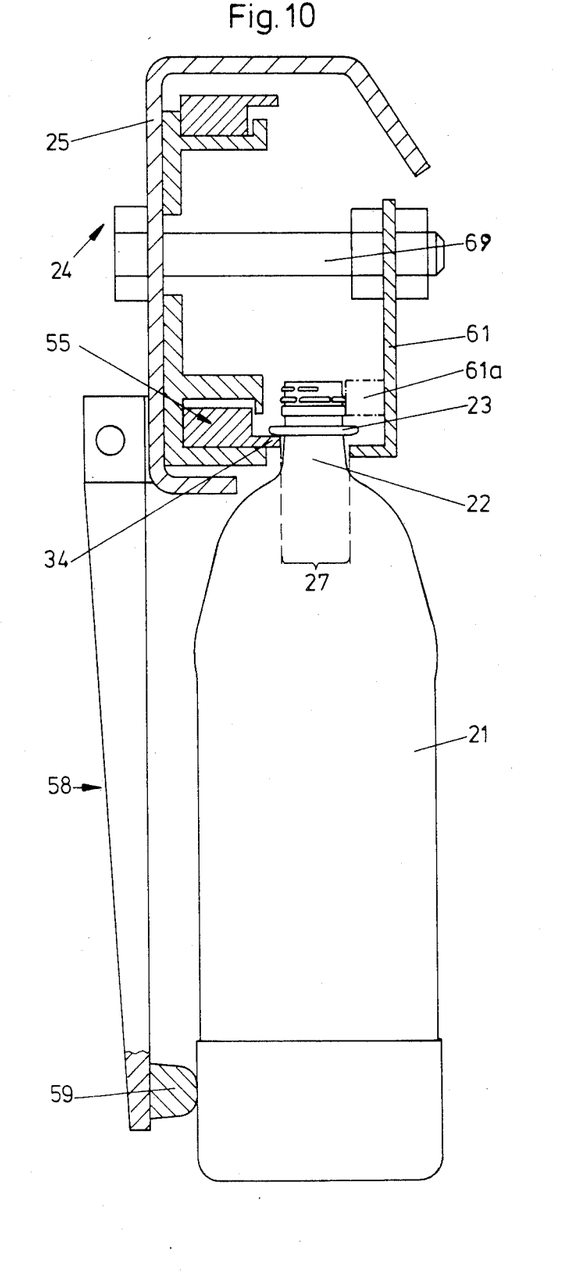
FIG. 10 is a vertical cross-sectional view through an inventive embodiment of a bottle-conveying apparatus that is basically similar to the embodiment of FIG. 9, yet is somewhat modified.
Figure 11:
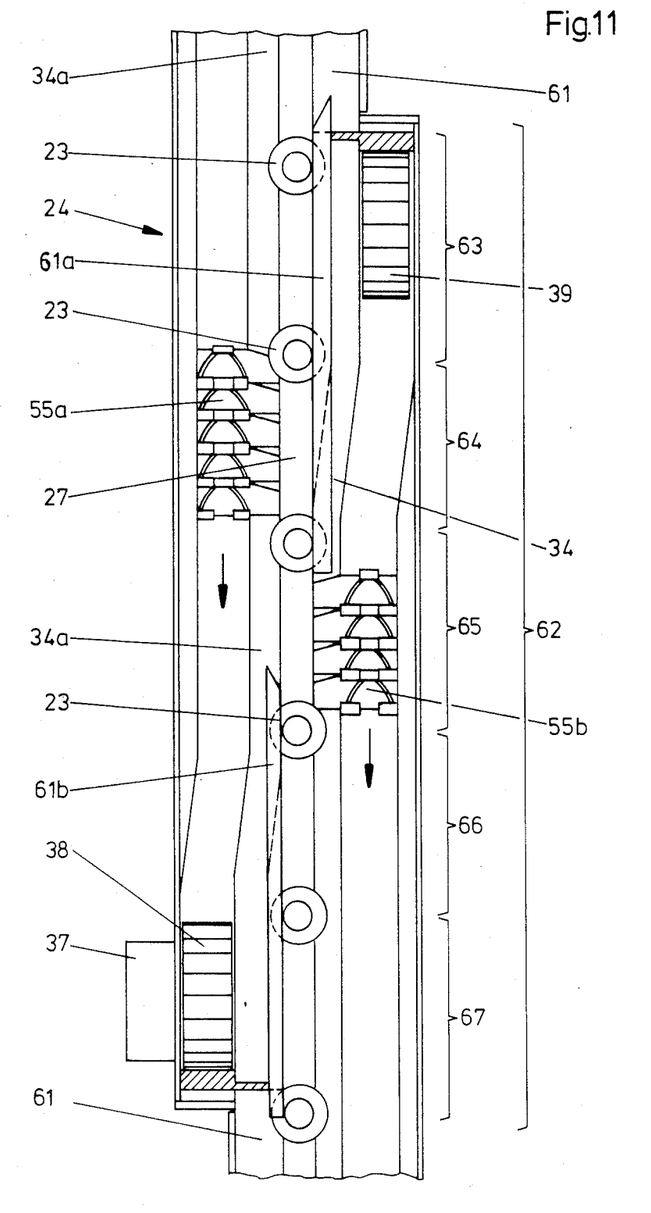
FIG. 11 is a horizontal cross-sectional view through a transition station of two successive bottle-conveying apparatus according to FIG. 9 or FIG. 10.

FIGS. 9 to 11 show embodiments of the bottle-conveying apparatus in which the bottle-conveying mechanisms contain only parts of the bottle carrier. In the embodiment of FIG. 9, only a single hinged chain 55 is disposed in the conveyer line 24, i.e. the conveyer line housing 25. In this embodiment, the chain 55 has a side edge region 34 on only one side of the widened guide region 33, which contains the hinge joint mechanisms. The upper return run of this hinged chain 55 is guided in the upper region of the conveyer line housing 25, whereas the lower run, which is used for conveying the bottles 21, travels on a profiled guide strip 56 at the bottom of the conveyer line housing 25. Extending parallel to the side edge region 34 of the hinged chain 55, or to the guide strip 56, and spaced laterally therefrom by a distance that is greater by a desired play than the diameter of the bottle neck 22, is a counter or cooperating guide strip 57 that is fixed to the base of the conveyer line housing 25. Thus, the guide slot 27 is formed between the facing side edges of the counter guide strip 57 and the side edge region 34 of the hinged chain 55. As shown in FIG. 9, the counter guide strip 57 is disposed somewhat lower than the upper side of the side edge region 34 of the hinged chain 55, so that with a vertically suspended bottle, the bead 23 of the bottle neck 22 rests only upon the side edge region 34 of the hinged chain 55, and is lifted off of the counter guide strip 57. In this way, the counter guide strip 57 forms only a lateral delimitation of the guide slot 27, with this delimitation preventing the bead 23 from sliding off of the side edge region 34 of the hinged chain 55. The vertical position of the bottles 21 that are to be conveyed is assured by a rail 58 that can be adjusted in conformity with the thickness and the height of the body of the bottle. The rail 58 is provided with a guide strip 59 along which the bottles slide. The rail bars 60 are pivotably mounted to the conveyer line housing 25 about a horizontal axis, and can thereby be adjusted to the lateral dimensions of the respective bottles 21 that are being conveyed.

In the modified embodiment of FIG. 10, the conveyer line housing 25 is open on the side of the counter guide strip 61. The latter is therefore embodied as an angular profiled strip. The vertical leg of the counter guide strip 61 in this way represents a portion of the housing wall, whereas the horizontal leg forms the actual counter or cooperating guidance for the bottle neck 22. In this embodiment, the guide slot 27 is again formed between the opposite edges of the side edge region 34 of the hinged chain 55 and the counter guide strip 61. In this embodiment, the counter guide strip 61 is laterally adjustably mounted on the conveyer line housing 25 via threaded bolts 69. By the lateral adjustment of the counter guide strip 61 at the threaded bolts 69, the width of the guide slot 27 can be adjusted. The counter guide strip 61 is disposed somewhat lower than the upper side of the side edge region 34 on the hinged chain 55, so that the bottle neck bead 23 of the vertically held bottles 21 rests only upon the side edge region 34 of the hinged chain 55, whereas the bead 23 is lifted off from the counter guide strip 61. A rail 58 is also provided in the embodiment of FIG. 10. The sliding guide strip 59 of the rail 58 holds the bottles 21 that are to be conveyed in a vertical position, with the counter guide strip 61 assuring that the bead 23 does not slide off from the side edge region 34 of the hinged chain 55. In the embodiments of both FIGS. 9 and 10, the side edge region 34 of the hinged chain 55 thus forms only a portion of the bottle carrier. The further parts of the bottle carrier that cooperate with the side edge region 34 of the hinged chain 55 are the rail 58 and the counter guide strips 57 or 61. Providing the feed movement to the bottles that are to be conveyed is effected in this embodiment merely with the hinged chain 55.

FIG. 11 shows a transition station 62, in the form of a parallel station, disposed in the conveyer line 24. Such transition stations 62 are provided in longer conveyer lines 24 in order to achieve good effectiveness of the drive force for the conveyers. If the length of the conveyer line 24 exceeds a certain dimension, it is necessary to provide, for the conveyers, guide mechanisms that result in high friction of the conveyers, and hence cause considerable loss of energy. The design principle of the transition station 62 is that two conveyers, which belong to different sections of the conveyer line 24, overlap on both sides of the guide slot 27, with one conveyer belt, for example the hinged chain 55a, belonging to the leading section of the conveyer line 24 and having its drive unit 37 and drive gear 38 at the exit region of the transition station, whereas the conveyer, i.e. the chain 55b, that belongs to the following section of the conveyer line 24, has its guide wheel 39 at the inlet region of the transition station 62. In order to transfer the beads 23 of the bottles that are to be conveyed from one conveyer to the other, i.e. from the hinged chain 55a to the hinged chain 55b, the latter, as described in connection with the inlet of FIG. 2, is guided into the conveyer line through a laterally offset section 63 and a transition section 64. The guide wheel 39 is disposed within the laterally offset or deflected section 63. The lateral offset is such that the bead 23 of the approaching bottles is initially held on the side edge region 34a of the hinged chain 55a at a lateral spacing from the side edge region 34b of the hinged chain 55b. This is achieved by a counter guide strip 61a that extends above the bead 23 along the mouthpiece of the bottle and assures further guidance. This counter guide strip 61a is secured to the conveyer line housing 25 above the plane of the horizontal leg, as shown in FIG. 10. In the transition section 64, the side edge region 34b of the hinged chain 55b approaches the side edge region 34a of the hinged chain 55a until the width of the guide slot 27 is achieved. In the section 65, the two hinged chains 55a and 55b then extend parallel to one another, with their side edge regions 34a and 34b being laterally spaced from one another in conformity with the guide slot 27. Following this section 65 is a second transition section 66 into which extends, at the level of the counter guide strip 61a, a counter guide strip 61b of the next conveying line section. In this transition section 66, the side edge region 34a of the hinged chain 55a is deflected or offset laterally from the side edge region 34b of the hinged chain 55b in order from there, in a section 67, to be guided around the drive gear 38 in a laterally offset position. However, the counter guide strip 61b that extends into the sections 66 and 67 supports the bottles via their beads 23 on the side edge region 34b of the hinged chain 55b. The successively arranged sections of the conveyer line 24 differ from one another merely in that in one section the hinged chain 55a is on the right side and in another section the hinged chain 55b is on the left side.

For conveyer lines having two conveyers that extend parallel to one another, the transition stations can be designed according to the same principle, with the single difference that on each side of the conveyer line, after the laterally offset exit region of the previous conveyer, there follow a laterally offset section of the next following conveyer disposed on the same side of the conveyer line; furthermore, the counter rail that guides the mouthpiece bridges the laterally offset sections.

The embodiments of FIGS. 12 to 15 provide for the complete separation of the bottle support and the mechanical mechanisms that provide the feed movement of the bottles.

Figures 12, 13:
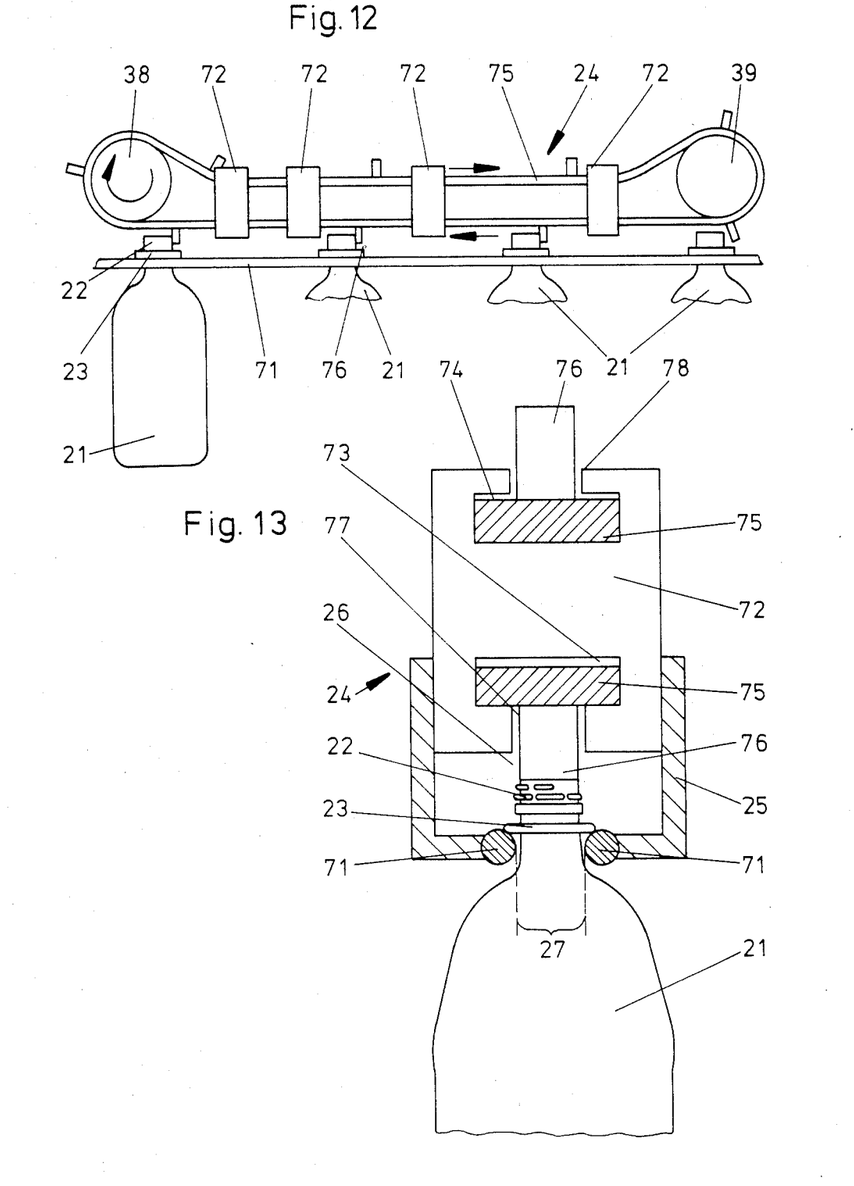
FIG. 12 is a diagrammatic view of another exemplary embodiment of the inventive bottle conveying apparatus with a stationary bottle carrier in the form of sliding guide elements and mechanical driving elements that are guided along the sliding guide elements
FIG. 13 is a vertical cross-sectional view through the bottle-conveying apparatus of FIG. 12.

In the embodiment of FIGS. 12 and 13, the bottle carrier is formed by two parallel sliding guide rods 71 that have an open space between them that corresponds to the width of the guide slot 27. In this embodiment, the guide rods 71 have a round cross section, and are mounted to the underside of the conveyer line housing 25. The hollow space 26 is formed in the interior of the conveyer line housing 25 above the sliding guide rods 71. The neck 22 and the bead 23 of the bottles 21 that are to be conveyed move through this hollow space 26. A guide strip or a series of guide blocks 72 are disposed above this hollow space 26. Lower and upper guide channels 73 and 74 are formed in these guide blocks 72; a feed or conveying member (conveyer) 75 is rotated through these guide channels 73 and 74. One side of the conveyer 75 is provided with driving fingers 76 that extend into the guide blocks 72 through appropriate slots 77 and 78. From the bottom run of the conveyer 75, which run is used for feeding the bottles, the driving fingers 76 extend through the slot 77 into the hollow space 26 formed above the sliding guide rods 71. In each case, the driving finger 76 extend behind the mouthpiece or the bead 23 of a bottle, and push the thus engaged bottle along the conveyer line 24. The distance between the driving finger 76 can be such that in each case a group of bottles is handled; for example, the driving fingers can engage each third or each fifth bottle. In the upper run of the conveyer 75, the driving finger 76 run freely. In a manner to that encountered with the other embodiments, the conveyer 75 can be guided at the inlet end of the conveyer line 24 via a guide wheel 39, and can be guided at the exit of the conveyer line 24 via a drive gear 38.

Figure 14:
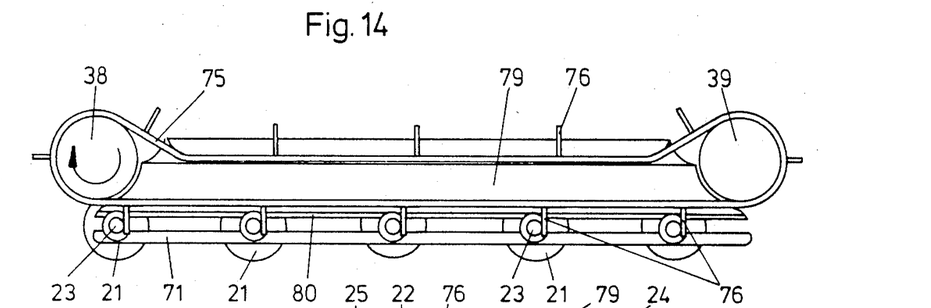
FIG. 14 is a diagrammatic view through a modified inventive embodiment of a bottle-conveying apparatus that in principle is constructed in the same manner as the embodiment of FIGS. 12 and 13 and FIG. 15 is a vertical cross-sectional view through the bottle-conveying apparatus of FIG. 14.
Figure 15:
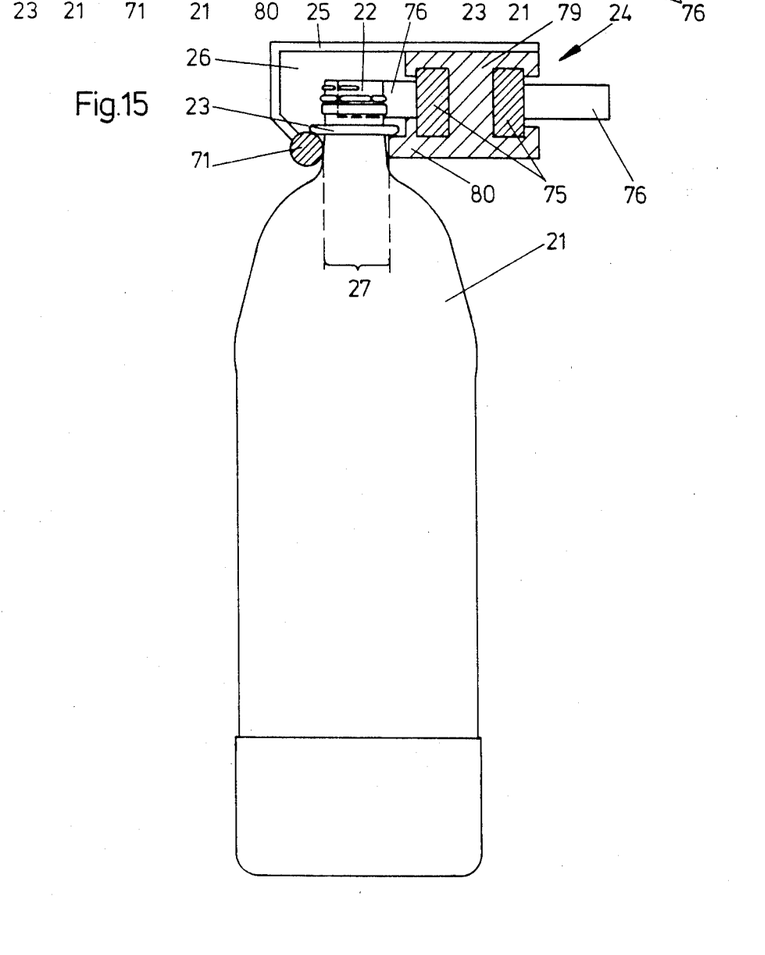

In the modified embodiment of FIGS. 14 and 15, the two runs of the conveyer 75 move horizontally next to one another in a single guide bar 79. For this purpose, the latter is mounted on the side of or in the conveyer line housing 25. In this embodiment, the driving fingers 76 of the conveyer 75, for example a chain, extend horizontally and, within the hollow space 26 formed in the conveyer line housing 25, engage behind the mouthpiece of the neck 22 of the bottles 21 that are to be conveyed. In this example, the bottle carrier is formed by one sliding guide rod 71 mounted on the conveyer line housing 25, and by a sliding guide strip 80 that is formed on the guide bar 79. The side edge of the sliding guide strip 80 is spaced from the sliding guide rod 71 by a distance that corresponds to the width of the guide slot 27. The bead 23 on the neck 22 of the bottles 21 that are to be conveyed slides on one side over the sliding guide rod 71, and on the other side over the sliding guide strip 80. As in the embodiment of FIGS. 12 and 13, and this embodiment also the distances between successive driving fingers 76 can be such that in each case one group of bottles 21 is pushed ahead by a single driving finger 76.

Conveying apparatus can, without difficulty, be composed of conveyer lines 24 having different embodiments, depending upon the respective conditions. For example, a conveying apparatus for cleaning plastic bottles can readily, by sections, comprise conveying apparatus according to FIG. 1, according to FIGS. 9 or 10, and according to FIGS. 12 and 13 or FIGS. 14 and 15. A single conveying unit can comprise conveyer lines 24 having a linear section, an upwardly or downwardly inclined section, as well as a section that extends along a curve. Such might be the case, for example, if the conveying apparatus has to entirely or partially follow the course of a conveying section that exists for glass bottles. For this purpose, the chain links of the hinged chains 31 and 32 can be provided with retaining devices, for example of a dovetailed design. Furthermore, the conveyer lines 24 can be supported on the floor of the room that accommodates the conveying unit. The conveyer lines 24 could also be suspended from the ceiling of the room, or could be combined with the frame of other conveying units.

The present invention is, of course, in no way restricted to the specific disclosure of the specification and drawings, but also encompasses any modifications within the scope of the appended claims.

What we claim is:

1. A bottle-conveying apparatus for conveying bottles along a conveying path between as well as within treatment and related bottle-handling stations along the conveying path, with said bottles each having a pronounced distinctly defined annular bead on the neck of the bottle; said apparatus comprising:
   a conveyor line, which extends over the conveying path;
   means forming a guide slot with the conveyor line;
   a bottle carrier means that is provided with the conveyor line and that extends along said conveying path, that extends below the annular bead on the neck of the bottle, and that guides said bottles in a suspended state loosely supported only with friction engagement contact, via said annular beads on the neck of said bottles respectively, with play, through said means forming the guide slot that extends along said conveying path;
   said bottle carrier means including a side edge region arranged with said conveyer line for providing said bottles with a feed movement for conveying said bottles and to provide said feed movement parallel to said means forming the guide slot for said bottle necks, with said forming said guide slot being provided on said bottle carrier means;
   said bottle carrier means further including a first endless conveyor movable along said guide slot for said bottle necks, at a feed speed that corresponds to the desired conveying speed; said conveyor includes said side edge region, said side edge region deli one side of said guide slot; said apparatus also includes further bottle carrier parts that keep said bottle beads on said side edge region of said conveyor;
   said further bottle carrier parts being formed by a second endless conveyor that also includes a side edge region, which is disposed opposite said side edge region of said a first conveyor, with said conveyers being guided parallel to, and at such a distance from, one another that said guide slot for said bottle necks is formed between said opposed side edge regions, with a secure seating for said bottle neck beads being formed on each side of said side edge regions; and
   said conveyors being operated at the same feed speed, namely the desired conveying speed for said bottles; each of said conveyers being embodied as a hinged chain that is able to follow a laterally converging curved path, with each of said chains having at least one side edge region, and adjacent thereto a guide region that projects beyond said side edge region.

2. An apparatus according to claim 1, in which each of said conveyers is provided with a guide region that is disposed adjacent to said side edge region thereof and extends, as a thickened portion, beyond said side edge region on only one side of said conveyer, with the opposite side of the latter being continously planar; and which includes a conveyer line housing having a bottom wall with an inner surface for supporting said planar side of said conveyer, with that side of said side edge region of said conveyer opposite said planar side forming a support for said bottle neck beads.

3. An apparatus according to claim 1, in which said conveyer line includes an inlet region in which the width of said guide slot for said bottle necks is wider than a preset width; and which includes a transition guide section in which the width of said guide slot continously narrows 4. An apparatus according to claim 3, in which said widened width is wider than the diameter of said bottle neck beads.

5. An apparatus according to claim 1, in which said conveyer line includes transition stations for transferring bottles from said first-mentioned endless to a subsequent said second endless conveyor that is disposed downstream from said first endless conveyer.

6. An apparatus according to claim 1, in which said conveyer line is provided with an elongated housing that is disposed above said guide slot for covering the latter and associated parts of said bottle carrier; said housing is provided with a guide space that is open downwardly via said guide slot.

7. A bottle-conveying apparatus for conveying bottles along a conveying path between as well as within treatment and related bottlehandling stations along the conveying path, with said bottles each having a pronounced distinctly defined annular bead on the neck of the bottle; said apparatus comprising:
   a conveyer line, which extends over the conveying path;
   means forming a guide slot with the conveyor line;
   a bottle carrier that is provided with the conveyor line and that extends along said conveying path, that extends below the annular bead on the neck of the bottle, and that guides said bottles in a suspended state loosely supported only with friction engagement contact, via said annular beads on the neck of said bottles respectively, with play, through said means forming the guide slot that extends along said conveying path;
   said bottle carrier means including a side edge region arranged with said conveyer line for providing said bottles with a feed movement for conveying said bottles and to provide said feed movement parallel to said means forming the guide slot for said bottle necks, with said means forming said guide slot being provided on said bottle carrier means;

said bottle carrier means further including at least one endless conveyer movable along said guide slot for said bottle necks, at a feed speed that corresponds to the desired conveying speed; said conveyer includes said side edge region said side edge region delimits one side of said guide slot said apparatus also includes further bottle carrier parts that keep said bottle beads on said side edge region of said conveyer; said at least one conveyer being embodied as a flexible endless belt; and guide elements that direct a side edge of the conveying run of said belt upwardly at an angle to below said bottle neck beads.

8. An apparatus according to claim 7, in which said further bottle carrier parts are formed by a second conveyer that also includes a side edge region, which is disposed opposite said side edge region of said at least one conveyer, which said conveyers being guided parallel to, and at such a distance from, one another that said guide slot for said bottle necks is formed between said opposed side edge regions, with a secure seating for said bottle neck beads being formed on each of said side edge regions.

9. An apparatus according to claim 8, in which said conveyers are operated at the same feed speed, namely the desired conveying speed for said bottles.

10. An apparatus according to claim 8, in which each of said conveyers is embodied as an endless, flexible belt that has at least one side edge region for supporting said bottle neck beads, and a strip-like guide region that is thicker than said side edge region.

11. An apparatus according to claim 8, in which each of said conveyers is embodied as an endless, flexible profiled cord; and which includes cord-guiding elements for guiding at least a portion of said cord below said bottle neck beads to support the latter and form said guide slot for said bottle necks.

12. An apparatus according to claim 11, in which each of said cords has a round cross-section.

* * * * *